June 3, 1969  T. THOMAIER ET AL  3,447,845

GAS BEARING

Filed March 3, 1967  Sheet 1 of 2

INVENTORS
Dieter Thomaier &
Heinz Riethmüller
BY Spencer & Kaye
ATTORNEYS

June 3, 1969   T. THOMAIER ET AL   3,447,845
GAS BEARING

Filed March 3, 1967   Sheet 2 of 2

INVENTORS
Dieter Thomaier &
Heinz Riethmüller
BY Spencer & Kaye
ATTORNEYS

United States Patent Office 3,447,845
Patented June 3, 1969

3,447,845
GAS BEARING
Dieter Thomaier, Heidelberg, and Heinz Riethmüller, Heidelberg-Kirchheim, Germany, assignors to TELDIX Luftfahrt-Ausrustungs G.m.b.H., Heidelberg-Wiebling-en, Germany
Filed Mar. 3, 1967, Ser. No. 620,512
Claims priority, application Germany, Mar. 3, 1966, T 30,579
Int. Cl. F16c 1/24, 33/66, 13/02
U.S. Cl. 308—122                                     10 Claims

ABSTRACT OF THE DISCLOSURE

A gas bearing composed of a floated part of circular cross section and disposed in a hollow recess of circular cross section formed in a housing so as to create an air gap between the inner housing wall and the outer surface of the floated part, the air gap having an annular portion of increased radial depth disposed substantially midway between the axial extremities of the gap, the bearing being provided with but a single ring of gas inlet conduits extending through the housing and communicating directly with the annular portion of the air gap.

Background of the invention

The present invention relates to gas bearings, and particularly to bearings having a single ring of gas inlets.

There exist various types of static gas cushion type bearings, that is to say, gas bearings which are fed from an external source of pressure. A complete bearing unit generally consists of a floated part and a stationary part having a radial bearing portion and one or two axial bearing portions for supporting the floated part and is used, preferably, for bearings involving low angular speeds, such as for precessional axis bearings in gyrocompasses for example.

The present invention relates to static radial gas bearings and has as its object a bearing which can be manufactured easily and which has a good supporting ability and a high stability.

There exist so-called double row radial bearings in which no means are provided for carrying away the gaseous medium. In such bearings, there are two circlets of openings through which the gaseous medium is delivered, these circlets or rings being arranged approximately in the first and last third, respectively, of the longitudinal length of the bearing. See, for example, the First International Symposium on Gas Lubricated Bearings, Oct. 26 to 28, 1959, Washington, D.C. ACR–49, (Office of Naval Research, Department of the Navy, Washington, D.C.), p. 347, FIG. 1. In the bearing there illustrated, the pressure distribution in an axial direction along the bearing gap, i.e. the pressure profile, is approximately trapezoidal. The pressure drops continuously in a direction from the two inlet rings toward the ends of the bearing and is constant in the center region between the two rings.

In order to prevent the occurrence of any turbine torque, the axes of the gas inlet conduits, which deliver gas to the regions between the stationary part bearing portions and the floated part, must all intersect at one point. The greater the number of inlet conduits, the more difficult it is to achieve this result. Thus, it would facilitate the manufacture of the bearing, and it would also reduce the problem of turbine moment, if the number of inlet points were reduced. However, there is a limit to how far the number of inlet openings of such a ring can be reduced if the gaseous flow and pressure distribution about the circumference is to remain even throughout the circumference. Progress can only be made by providing but a single ring of inlet openings.

Devices utilizing such a single ring of inlet openings are likewise known. (See, for example, Gas Film Lubrication, W. A. Gross, IBM Research Laboratories, San Jose, California (John Wiley and Sons, Inc., New York, London, 1962), p. 279, FIGURE 5.3.1(g), (h). Such simple single ring bearings, however, have, due to the triangular pressure profile associated therewith, a lower load supporting ability and are less resistant to stabilization breakdown, i.e. when the shaft of the floated part pivots about an axis which is at right angles to its axis of rotation, hardly any return moment is created.

To overcome these drawbacks, the single ring bearing must also be given a trapezoidal pressure distribution. In order to do this, it has been proposed to machine rectangular recesses into the cylindrical bearing surface, i.e. the radial bearing portion of the stationary part, and to dispose a gas inlet conduit in the center of each such rectangular recess (see FIGURE 5.3.1(h) of the above publication). Since each recess thus constitutes a pocket, which pockets are separated from each other by strips lying at the same level as the remainder of the radial bearing surface, the gas pressure within the pockets is caused to remain practically constant, and to drop only from the edges of the pockets toward the ends of the bearing portion. In this way, the desired trapezoidal pressure profile is obtained.

It is, however, exceptionally difficult to fabricate these pockets because although their depth is a multiple of the normal gas gap, such depth is nonetheless only of the order of approximately 30 microns. As a result, the work involved in forming such pockets is even greater than that involved in providing a second ring of gas inlet openings, which is the main reason why such single ring gas bearings have heretofore not been used in practice.

Summary of the invention

It is a primary object of the present invention to overcome these drawbacks and difficulties.

A more specific object of the present invention is to simplify the fabrication of gas bearings of the type having but a single ring of gas inlets.

Another object of the present invention is to provide a gas bearing having but a single ring of gas inlets and automatically producing forces which counteract any tilting of the axis of the floated part out of alignment with the axis of the stationary part.

Yet another object of the present invention is to provide an improved form of construction for the air gap of such bearings.

These and other objects according to the present invention are achieved by the provision of certain improvements in a radial gas bearing including an outer part having an inner bearing surface of circular cross section and an inner part having an outer surface of circular cross section and arranged for rotation within the outer part, which surfaces form between themselves a gap, the bearing further including a single ring of gas inlet conduits communicating with the gap for introducing gas therein to provide a gas cushion. The improvements according to the present invention basically consist in that at least one of the parts is provided with an annular groove which extends around the entire circumference of the respective part and which is radially recessed with respect to the remainder of the surface of the one part, thereby to form an annular chamber which is deeper than the remainder of the gap, the annular chamber being located at least approximately in the center of the axial length of the bearing, and that all of the conduits communicate directly with this chamber.

Brief description of the drawings

FIGURE 1b is a chart of the pressure profiles existing along the upper edge of the air gap of the arrangement of FIGURE 1a.

FIGURE 2b is a chart similar to that of FIGURE 1b corresponding to the conditions shown in FIGURE 2a.

FIGURE 2c is a chart similar to that of FIGURE 1c corresponding to the condition illustrated in FIGURE 2a.

FIGURE 3 is a perspective view of the stationary part shown in FIGURES 1a and 2a.

Description of the preferred embodiments

Figure 1A:
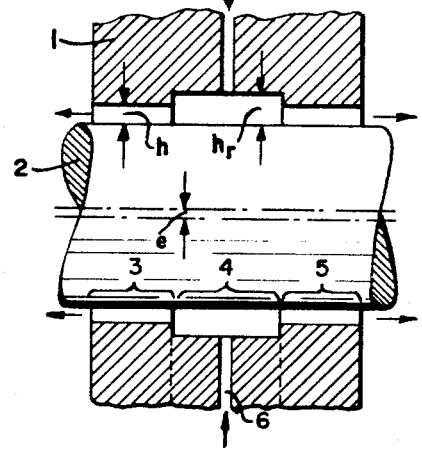
FIGURE 1a is a simplified longitudinal view, partly in cross section, of one embodiment of the present invention.

FIGURE 1a shows the basic components of a gas bearing composed of a stationary part, or bearing cup 1 and a floated part, or bearing pin 2. The bearing surface of the pin, in this case its entire outer surface, is a perfect circular cylinder, while the inner surface of the bearing cup is divided in an axial direction into three annular zones 3, 4 and 5. The middle zone 4 is deeper than the other two and thus defines an annular pressure accumulation chamber. The gas conduits 6 communicate directly with this chamber and are distributed uniformly around the entire circumference of the air gap and thus forms a circlet which lies midway between the axial extremities of the bearing. For the sake of simplicity the conduits 6 are shown as cylindrical radial bores, the normally provided throttling means, such as nozzles, filters and the like, not being shown. The bearing pin 2, due to its weight, tends to be displaced from the center of the recess in housing 1 by an amount represented by the eccentricity $e$. The nominal width $h$ of the air gap is, when pin 2 is centered in the recess, approximately 15 microns, while the width $h_r$ of the chamber defined by zone 4 is, for example, 35 microns.

Figure 1B:
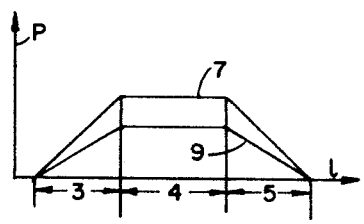
Figure 1C:
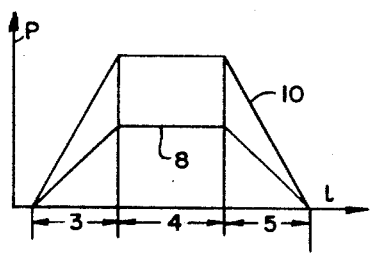
FIGURE 1c is a chart similar to that of FIGURE 1b for the lower edge of the air gap.

FIGURES 1b and 1c show the pressure profile P along the upper and lower edges of the gap, the upper edge being at the top of the bearing and the lower edge being at the bottom thereof when the bearing is in the position shown in FIGURE 1a with the housing and pin axes horizontal. The two trapezoidal curves 7 and 8 refer to the centered position of the bearing pin. The curves 9 and 10 on the other hand, relate to the eccentric position shown in the drawing, in which the axis of part 2 is disposed below its centered position by a distance $e$. The horizontal portion of each trapezoidal curve corresponds to the region occupied by the annular chamber in zone 4. At the top edge of the gap, where the gap is greater, there is a lower pressure than at the bottom edge, where the gap is narrower. The differences in the pressure exerted on the upper and lower halves of the bearing pin 2, in a vertical direction, produce a resulting force which maintains an equilibrium with the weight of the bearing pin 2.

Figure 2A:
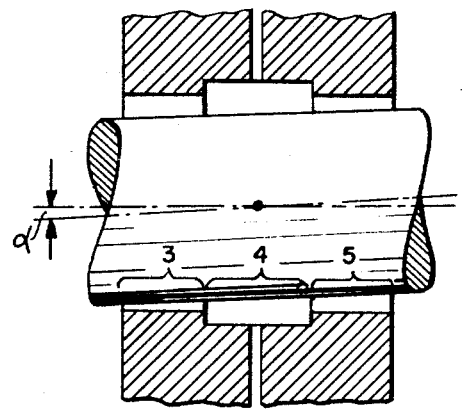
FIGURE 2a is a view similar to that of FIGURE 1a of the same embodiment in a condition in which the axis of the floated part is inclined with respect to that of the stationary part.
Figure 2B:
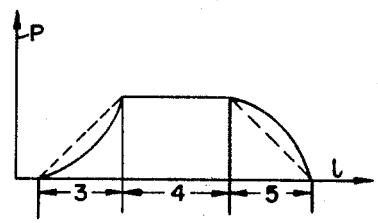
Figure 2C:
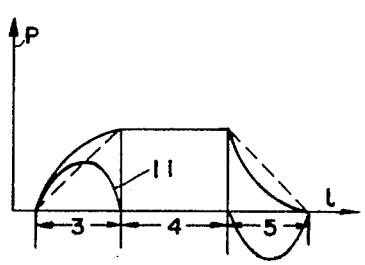

FIGURES 2 show the axis of bearing pin 2 to be tilted by a certain angle with respect to the axis of cup 1. It will be seen that this causes the upper and lower gap edges to each have an enlarged portion and a narrowed portion, the enlarged gap portion producing a diffusion gas flow and the narrow gap portion producing a nozzle flow. In this case, too, the pressure in the annular chamber remains substantially constant throughout the entire length thereof. On the other hand, in the case of the diverging gap, (i.e., the gaps at the upper edge of zone 3 and the lower edge of zone 5), the pressure curves bend downwardly and in the cas eof converging gap (i.e., the gaps at the lower edge of zone 3 and the upper edge of zone 5), the curves bend upwardly. In FIGURES 2b and 2c, the dotted curves represent the conditions existing when the axes are parallel, while the solid curve shows the conditions when the axis of pin 2 is tilted. The difference between the upper and lower pressure curve produces the return moment by means of which the axial alignment of the two bearing parts is stabilized. This difference is shown in FIGURE 2c by the curve 11.

Figure 3:
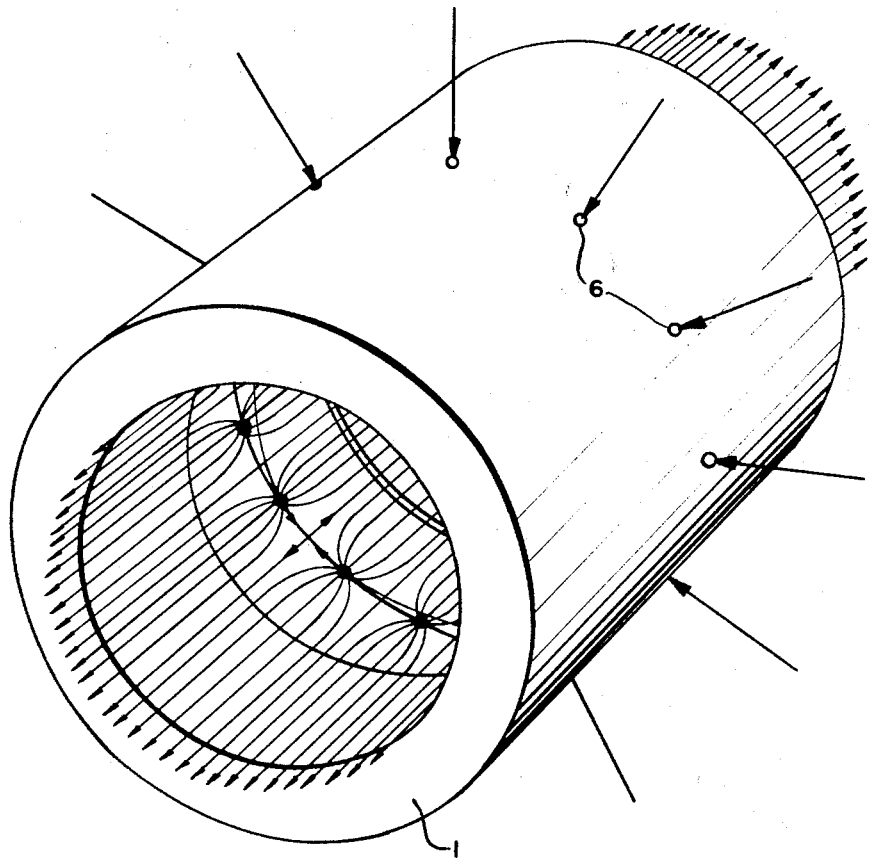

FIGURE 3 shows the gas flow pattern along the inner surface of cup 1 when the bearing pin 2 is in its normal centered position. For the sake of clarity, however, the pin 2 has been removed. The gas, as shown by the arrows, flows into the annular pressure accumulating chamber through the radial conduit bores 6. Near the outlets of these conduits, at the inner surface of cup 1, the stream first flows radially and is then deflected into a parallel flow in the axial direction. At each point around the ring of inlet conduits and midway between each adjacent pair of conduits there will be a point at which the rate of gas flow will be zero. If the bearing pin 2 is eccentrically positioned, the parallel axial flow will be diverted somewhat in a radial direction. However, no continued flow in a circumferential direction will occur within the annular chamber.

Figure 4:
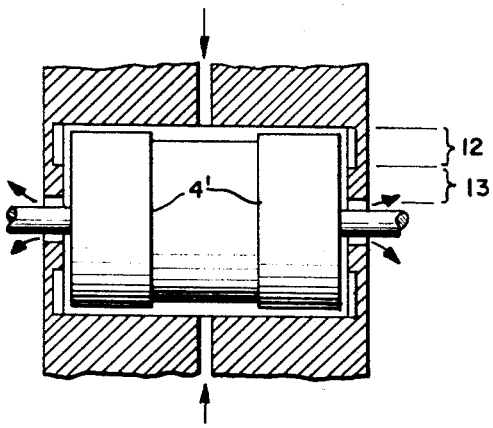
FIGURE 4 is a view similar to that of FIGURE 1a of another embodiment of the present invention.

In the embodiment of FIGURE 4, the recess forming the pressure accumulating chamber is machined in the bearing pin 2 as shown at 4', while the bearing cup 1 has, throughout, a uniform diameter. This, however, does not affect the operation of the device or the pressure distribution, these being the same as in the embodiment of FIGURES 1 and 2. At each end of the cup there is a disk bearing which provides axial centering. In the case of the disk bearings, there is also an outer ring zone 12 defining a larger gap and an inner ring zone 13 having a high quality surface and defining a narrower gap. Whether it is the disk or the end surface of the bearing pin which has the recess defining zone 12 is of no importance.

This deepened annular region 4 or 4' which when the bearing is assembled, forms an annular pressure accumulating pocket, can be produced very simply by turning the bearing cup 1 after it has been fabricated, or by turning the bearing pin. Furthermore, it is only necessary that the two outer bearing rings in regions 3 and 5, which define the narrow gaps, be machined with the requisite surface quality and tolerances. This greatly facilitates the manufacture of the bearings according to the present invention as compared with heretofore known bearings.

The surface quality of the recessed part, i.e. the annular pocket, need not be as high as that of the surfaces which delimit the narrower air gap portions. The reason for this is that the rate of flow in the pocket is substantially less than in the narrow gap portions so that any irregularities in the surface portions defining the pocket do not produce the same current flow distortions as would occur in the narrower bearing gap portions. Furthermore, slight fluctuations in the depth of the pocket due to surface irregularities have hardly any effect at all on the pressure distribution in the pocket inasmuch as the depth $h$ of the gap appears in the formula for the pressure drop as a function of $1/h^3$, so that the pressure drop in the pocket is small as compared to the pressure drop in the narrower gap portions. Therefore, the pressure can, as mentioned above, be assumed to be constant throughout the entire axial length of the pocket.

The unexpectedness of the results achieved by the present invention may be best appreciated if it is recalled that it was previously expected that without the axially extending webs between the individual recessed pockets, as shown in FIGURE 5.3.1(h) of the above-cited IBM article, the conventional single ring bearings would experience a flow in a circumferential direction and hence in a pressure equalization between the lower and upper regions of the annular pressure accumulating chamber. According to the prior reasoning, it was assumed that when the gas supply was shut off and the axis of the bearing pin was horizontal, it would, under the influence of its own weight, come to lie on the bearing cup. In this position, the size of the gap $h$ would equal zero along its lower edge and would equal $2h_0$ at its upper edge, where $h_0$ is the average size of the gap when the pin is centered in the cup. Why, then, it was reasoned, should the gas coming out of the lowermost and adjacent inlet openings lift up the bearing pin and force itself through the narrow gap portions at the lower gap edge, if at the upper gap edge there was a free, relatively wide path? From this premise, it was assumed that such a pin would not be raised up at all and that the bearing would therefore be useless. In reality, however, a so-called "source grid flow" is formed in the annular pressure accumulating chamber, the components of which flow past in a longitudinal direction and constitute a sort of "wind screen" which presents a high resistance to any potential circumferential flow. In this connection it should be noted that the annular pocket or chamber, can not be made too deep because the wind screen effect would then not appear or would appear only to an unsatisfactory extent.

The depth $h_r$ of the annular pressure accumulating chamber and the axial length of the pocket can vary over a wide range. Practical and reasonable limits for $h_r$ are three times to five times the depth $h$ of the narrow gap. The length of the pocket may vary from 0.3 to 0.9 of the total length of the bearing.

The invention can be used for many purposes. In particular it is suited for the precessional bearing in a gyrocompass or for solving other bearing problems in which it is particularly important that there be no spurious torques.

In addition, it has been found that a greatly improved gas bearing can be produced by the combination of the radial bearing according to the present invention with one or two stepped disc bearings serving as axial bearings, the same being fed from the exhaust air leaving the radial bearings which air has a centripetal direction of flow along the axial bearings. In this type of axial disc bearing it is preferable that there be provided a radially outermost ring zone having a larger gap and serving as a pressure accumulating chamber, and an inner ring zone which surrounds axial air exhaust openings, which has a smaller gap than the outermost ring zone and which has particularly accurately machined surfaces to form the axial load supporting gap.

It will be understood that the above description of the present invention is susceptible to various modifications, changes, and adaptations, and the same are intended to be comprehended within the meaning and range of equivalents of the appended claims.

We claim:

1. In a radial gas bearing comprising an outer part having an inner radial bearing surface of circular cross section and an inner part having an outer radial surface of circular cross section and arranged for rotation within said outer part, said surfaces forming between themselves a radial gap, the improvement wherein there is a single ring of gas inlet conduits communicating with said gap for introducing gas therein to provide a gas cushion, at least one of said parts is provided with an annular groove which extends throughout the entire circumference of the respective part and which is radially recessed with respect to the remainder of said surface of said one part, thereby to form an annular chamber which is deeper than the remainder of said gap, said annular chamber being located at least approximately in the center of the axial length of the bearing, and each said inlet conduit communicates directly with said chamber.

2. An arrangement as defined in claim 1 wherein said groove is formed in said surface of said outer part.

3. An arrangement as defined in claim 1 wherein said groove is formed in said surface of said inner part.

4. An arrangement as defined in claim 1 wherein both of said surfaces are cylindrical.

5. An arrangement as defined in claim 4 wherein said groove extends over approximately one third of the axial length of said gap.

6. An arrangement as defined in claim 4 wherein, when said inner part is centered in said outer part, the depth of said chamber is of the order of 35 microns and the depth of the remainder of said gap is of the order of 15 microns.

7. An arrangement as defined in claim 4 wherein said inner part has at least one axial end surface, said outer part is provided with at least one annular end disc having an axial surface disposed adjacent said at least one axial end surface of said inner part to form an axial gap therewith.

8. An arrangement as defined in claim 7 wherein part of at least one of said axial surfaces is axially recessed to define an annular chamber which is deeper than, and which is disposed radially outwardly of, the remainder of said axial gap.

9. An arrangement as defined in claim 8 wherein said disc is provided with a central gas exhaust opening.

10. An arrangement as defined in claim 8 wherein said inner part has two such axial end surfaces and said outer part is provided with two such end discs each disposed adjacent a respective end surface of said inner part.

References Cited

UNITED STATES PATENTS

| | | | |
|---|---|---|---|
| 2,684,272 | 7/1954 | Annen | 308—9 |
| 2,964,339 | 12/1960 | Macks | 308—9 X |
| 3,112,140 | 11/1963 | Adams | 308—122 |
| 3,199,931 | 8/1965 | Martz | 308—9 |
| 3,321,254 | 5/1967 | Dock | 308—9 |

CARROLL B. DORITY, JR., *Primary Examiner.*

U.S. Cl. X.R.

308—170